(12) United States Patent
Strütt et al.

(10) Patent No.: US 11,586,165 B2
(45) Date of Patent: Feb. 21, 2023

(54) FIELD DEVICE ELECTRONICS FOR A FIELD DEVICE USED IN AUTOMATION ENGINEERING

(71) Applicant: Endress+Hauser SE+Co. KG, Maulburg (DE)

(72) Inventors: Bernd Strütt, Steinen (DE); Max Bauer, Rheinfelden (DE); Andreas Fuz, Efringen-Kirchen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 290 days.

(21) Appl. No.: 16/956,463

(22) PCT Filed: Nov. 30, 2018

(86) PCT No.: PCT/EP2018/083171
§ 371 (c)(1),
(2) Date: Jun. 19, 2020

(87) PCT Pub. No.: WO2019/120942
PCT Pub. Date: Jun. 27, 2019

(65) Prior Publication Data
US 2021/0088991 A1 Mar. 25, 2021

(30) Foreign Application Priority Data
Dec. 20, 2017 (DE) .................. 10 2017 130 775.3

(51) Int. Cl.
*G05B 19/042* (2006.01)
*G05B 19/418* (2006.01)

(52) U.S. Cl.
CPC ..... *G05B 19/042* (2013.01); *G05B 19/41845* (2013.01); *G05B 2219/25289* (2013.01); *G05B 2219/25428* (2013.01)

(58) Field of Classification Search
CPC ............ G05B 19/042; G05B 19/41845; G05B 2219/25289; G05B 2219/25428; G05B 2219/25357
See application file for complete search history.

(56) References Cited

U.S. PATENT DOCUMENTS

| | | | |
|---|---|---|---|
| 2004/0128085 A1* | 7/2004 | Ramirez | H02J 3/14 702/65 |
| 2005/0280423 A1 | 12/2005 | Barbour et al. | |

(Continued)

FOREIGN PATENT DOCUMENTS

| | | | |
|---|---|---|---|
| CA | 2800660 A1 * | 11/2011 | ......... G05B 19/0423 |
| CN | 1209914 A | 3/1999 | |

(Continued)

*Primary Examiner* — Chad G Erdman
(74) *Attorney, Agent, or Firm* — Mark A. Logan; Endress+Hauser (USA) Holding, Inc.

(57) ABSTRACT

Disclosed is a field device electronics for a field device of automation engineering, comprising: first and second terminals for connecting the field device electronics to a cable for an electrical input current to the field device electronics; a series regulator to set the input current; a shunt regulator following the series regulator; a first capacitance connected in parallel with the shunt regulator for energy storage; a supply circuit connected in parallel with the shunt regulator and the first capacitance for providing an operating voltage; and connected after the supply circuit and supplied by the operating voltage, a control unit adapted to register a buffer voltage lying across the first capacitance, based on the registered buffer voltage, to make a decision concerning at least one part of the field device electronics.

21 Claims, 1 Drawing Sheet

(56) References Cited

U.S. PATENT DOCUMENTS

2015/0046728 A1    2/2015  Ma et al.
2015/0237183 A1*  8/2015  Novet ............... H04M 1/72454
                                                                                        455/556.1

FOREIGN PATENT DOCUMENTS

| CN | 1992491 A | 7/2007 | |
| --- | --- | --- | --- |
| CN | 102279595 A | 12/2011 | |
| CN | 102545586 A | 7/2012 | |
| CN | 104734577 A | 6/2015 | |
| CN | 106168823 A | 11/2016 | |
| CN | 106461729 A | 2/2017 | |
| CN | 107431429 A | 12/2017 | |
| DE | 19723645 B4 | 4/2006 | |
| DE | 202006018640 U1 | 5/2008 | |
| DE | 102006062603 A1 | 7/2008 | |
| DE | 102008062815 A1 | 6/2010 | |
| DE | 102009014252 A1 | 9/2010 | |
| DE | 102010062310 A1 | 6/2012 | |
| DE | 102015115275 A1 | 3/2017 | |
| DE | 102015115275 A1 * | 3/2017 | ........... G05B 19/042 |
| DE | 102016120444 A1 | 4/2018 | |
| RU | 2585278 C1 | 5/2016 | |

* cited by examiner

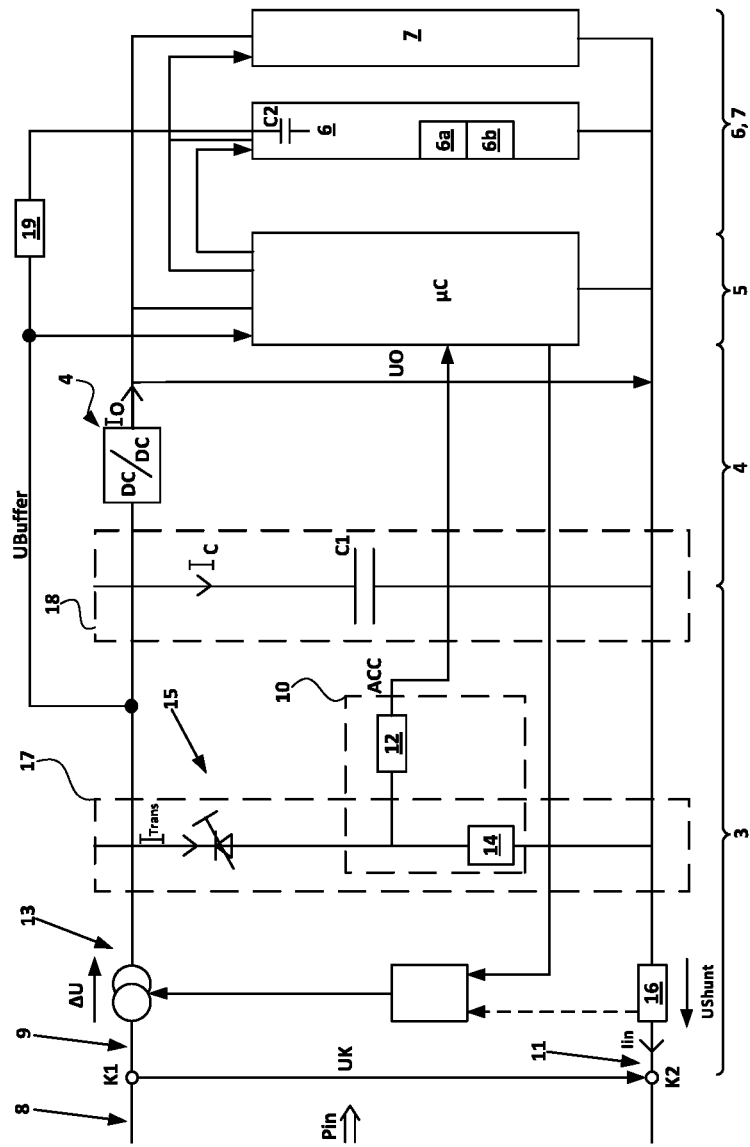

FIELD DEVICE ELECTRONICS FOR A FIELD DEVICE USED IN AUTOMATION ENGINEERING

CROSS-REFERENCE TO RELATED APPLICATIONS

The present application is related to and claims the priority benefit of German Patent Application No. 10 2017 130 775.3, filed on Dec. 20, 2017 and International Patent Application No. PCT/EP2018/083171, filed on Nov. 30, 2018, the entire contents of which are incorporated herein by reference.

TECHNICAL FIELD

The invention relates to a field device electronics for a field device of automation engineering and to such a field device having such a field device electronics.

BACKGROUND

Field devices of automation engineering serve quite generally for measuring process variables, for example, a variable representing a pressure- or a fill level. Field devices are connected via a cable, especially a two-wire cable, to a superordinate unit. Field devices of this type are applied especially in industrial measuring- and control technology, as well as in automation and process control technology, for measuring process variables.

As a function of the process variables to be measured, in the present state of the art, a large number of different field devices, such as e.g. pressure-, temperature-, flow- and/or fill level field devices, are applied for this.

Via the cable, there occurs between the field device and the superordinate unit during operation both an energy supply of a field device electronics located in the field device and a signal transmission, especially an output signal representing the process variable. For this, field devices deliver output signals, which correspond to the measured values of the registered process variables. The output signals are transmitted to a superordinate unit connected to the field devices, e.g. a central control unit, e.g. a control station or a process control system, of an industrial plant. As a rule, the entire process control of the production- and/or treatment process running in the industrial plant is performed by the superordinate unit, where the output signals of various field devices are evaluated and, due to the evaluation, control signals are produced for actuators, which control the process flow.

The signal transmission of these devices, frequently also referred to as 2-wire field devices, occurs preferably according to standards usual in the industry, for example, the 4-20 mA standard.

In that standard, the signal transmission occurs in such a way that the electrical current flowing through the cable is set by the field device to an electrical current value representing the measured process variable. This electrical current value is then measured by the superordinate unit and correspondingly interpreted. For this, the electrical current is, in the present state of the art, regularly set corresponding to the measured process variable to values between 4 mA and 20 mA. Additionally, a communication signal can be superimposed on this electrical current representing the measured process variable. Thus, the electrical current is modulated around the value predetermined by the process variable. This is done corresponding to a predetermined communication protocol. Widely used for this in the present state of the art is the communication protocol defined by the HART standard, in the case of which there is superimposed on the electrical current lying between 4 mA and 20 mA a high frequency oscillation of +/−0.5 mA providing the communication signal.

Another group is formed by measuring devices connectable to a digital data bus. In the case of these measuring devices, the electrical current flowing through the line-pair is set to an electrical current value predetermined independently of the measured process variable, and the communication signal in the form of a high frequency oscillation is superimposed on this electrical current. Known standards for this are PROFIBUS, FOUNDATION FIELDBUS and CAN-BUS.

Field devices of this type usually have a field device electronics with two connection terminals, via which the field device electronics can be connected with the cable. The field device electronics includes, in general, furthermore, a series regulator installed in a supply conductor to set an electrical current flowing via the cable. The field device electronics also generally includes a shunt regulator following the series regulator and installed in a transverse branch connecting the supply conductor with a return conductor.

Connected to the field device electronics can be, for example, a measuring device supplied with energy via a supply circuit and serving for determining the process variable and for producing a measurement signal representing the process variable.

Available to the field device, and to the field device electronics, via the cable is, as a rule, only a very limited energy amount predetermined via the input voltage supplied thereto and the electrical current set by the series regulator.

Accordingly, in the present state of the art, especially in the case of field devices having measuring devices with high energy requirement, such as e.g. measuring devices of fill level measuring devices working with microwaves or with ultrasound, methods for efficient use of the available energy are applied. One variant, in such case, is to determine the power registration indirectly from the known terminal voltage and the set electrical current minus an estimated value for consumption by individual components.

Disadvantageous in such variant is that, because of unknown power states of the individual components, the estimated power consumptions no longer match with reality.

An object of the invention, thus, is to remedy this situation.

SUMMARY

The object is achieved according to the invention by the field device electronics as defined in claim 1 and the field device as defined in claim 21.

The field device electronics of the invention for a field device of automation engineering comprises:
  first and second terminals for connecting the field device electronics to a cable, especially a two-wire cable, so that an electrical input current is suppliable to the field device electronics via the cable and a terminal voltage can be applied across the first and second terminals;
  a series regulator to set the input current, so that data, especially a measured value and/or parameter values, are transferable via the cable based on the electrical input current;
  a shunt regulator following the series regulator;
  a first capacitance connected in parallel with the shunt regulator for energy storage;

a supply circuit connected in parallel with the shunt regulator and the first capacitance for providing an operating voltage;

connected after the supply circuit and supplied with the operating voltage, a control- and/or evaluation unit, which preferably includes at least one microprocessor and which is adapted to register a buffer voltage lying across the first capacitance or to register a variable dependent on the buffer voltage and, based on the registered buffer voltage or a variable dependent thereon, to make a decision concerning, or for, at least one part of the field device electronics.

An advantageous embodiment of the invention provides that the making of the decision concerning the at least one part of the field device electronics comprises a determining of an up to date state, especially a failure state, of the at least one part of the field device electronics and/or the making of the decision for the at least one part of the field device electronics comprises a specific controlling of the at least one part of the field device electronics.

Another advantageous embodiment of the invention provides that the supply circuit includes a clocked DC/DC converter having a primary side and a secondary side, wherein the DC/DC converter is arranged in such a manner that at least the first capacitance is located on the primary side and the operating voltage lies on the secondary side, so that the operating voltage supplies at least the control- and/or evaluation unit.

In turn, another advantageous embodiment of the invention provides that the field device electronics has, furthermore, a comparison circuit, which preferably includes at least one comparator, which is adapted to register a transverse current in a first transverse branch, in which the shunt regulator is arranged, and to perform a comparison of the transverse current with a threshold value and to provide a signal, which shows a comparison result, to the control- and/or evaluation unit, wherein the control- and/or evaluation unit is adapted, furthermore, to register the buffer voltage or the variable dependent thereon as needed based on the signal. Especially, this embodiment can provide that the control- and/or evaluation unit is adapted to increase a frequency, with which the buffer voltage or the variable dependent thereon is registered, when the signal as comparison result shows an exceeding of the threshold value by the transverse current.

Another advantageous embodiment of the invention provides that the control- and/or evaluation unit is adapted, furthermore, based on the registered buffer voltage or the variable dependent thereon, to control a starting of modules connectable to the field device electronics. Especially, the embodiment can provide that, for controlling the starting of the connectable modules, the control- and/or evaluation unit is adapted to compare the buffer voltage or the variable dependent thereon with a starting threshold value and only upon the exceeding of the starting threshold value by the buffer voltage or the variable dependent thereon to supply the connectable modules with energy and/or that the control- and/or evaluation unit is adapted, furthermore, upon the subceeding of the starting threshold value by the buffer voltage or the variable dependent thereon, to signal a failure state.

Another advantageous embodiment of the invention provides that the field device electronics has, furthermore, a measuring device as connectable module for registering and/or setting a process variable, which measuring device is connected to the control- and/or evaluation unit, wherein the control- and/or evaluation unit is adapted, based on the registered buffer voltage or the variable dependent thereon, to control the measuring device. Especially, the embodiment can provide that the control- and/or evaluation unit is adapted for controlling the measuring device to compare the registered buffer voltage or the variable dependent thereon with a minimum buffer voltage value and, upon the subceeding of the minimum buffer voltage value, to run the measuring device in a safe state, in which the measuring device does not register and/or set the process variable, and/or that the control- and/or evaluation unit is adapted, furthermore, upon the subceeding of the minimum buffer voltage value, to perform a data backup, especially of the process variable registered by the measuring device.

In turn, another advantageous embodiment of the invention provides that, for determining the current state, especially the failure state, the control- and/or evaluation unit is adapted to compare the registered buffer voltage or the variable dependent thereon with the terminal voltage and, as a function thereof, to determine the current state of the at least one part of the field device electronics. Especially, this embodiment can provide that the control- and/or evaluation unit is adapted, furthermore, when the buffer voltage or the variable dependent thereon subceeds the terminal voltage by a predetermined value, to detect the failure state of the at least one part of the field device electronics.

In turn, another advantageous embodiment of the invention provides that the control- and/or evaluation unit ascertains based on the registered buffer voltage or the variable dependent thereon a power distribution for the at least one part of the field device electronics and activates the at least one part of the field device electronics corresponding to the ascertained power distribution. Especially, this embodiment can provide that the control- and/or evaluation unit for ascertaining the power distribution ascertains a remaining energy currently stored in the first capacitance and activates the at least one part of the field device electronics based on the currently stored, remaining energy.

In turn, another advantageous embodiment of the invention provides that the control- and/or evaluation unit ascertains the power distribution based on an energy requirement of the at least one part of the field device electronics required for executing a specific action. Especially, this embodiment can provide that the energy requirement required for executing a specific action is furnished, especially stored, in the control- and/or evaluation unit or in a component of the part of the field device electronics.

Another advantageous embodiment provides that the field device electronics has, furthermore, a second capacitance arranged on the primary side, wherein the field device electronics is adapted, based on the registered buffer voltage or the variable dependent thereon, at least partially to charge the second capacitance from the first capacitance. For example, the field device electronics can have for charging the second capacitance from the first capacitance a switchable element, e.g. an FET, a transistor or a switching regulator. Especially, this embodiment can provide that the first and second capacitances are dimensioned in such a manner that the second capacitance is larger than the first capacitance at least by a factor of 2, preferably a factor of 5, especially preferably a factor of 10.

In turn, another advantageous embodiment of the invention provides that the at least one part of the field device electronics has at least one, preferably at least two, especially preferably at least three of the following components, or modules:

the control- and/or evaluation unit, a touch screen, which is connected to the control- and/or evaluation unit, one, and, in given cases, the second, capacitance, a, or the, measuring device serving for registering and/or setting a process variable and connected to the control- and/or evaluation unit, and/or a radio module serving for wirelessly transferring data, especially measured values and/or parameter values, and connected to the control- and/or evaluation unit.

The field device of the invention includes a field device electronics according to at least one of the above described embodiments.

The invention will now be explained in greater detail based on the appended drawing. The sole FIGURE of the drawing shows as follows:

BRIEF DESCRIPTION OF THE DRAWING

FIG. 1 show a circuit diagram of a field device electronics located within a field device.

DETAILED DESCRIPTION

FIG. 1 shows a circuit diagram of a field device electronics 2 located within a field device. The field device electronics 2 includes an input circuit 3, an internal power supply circuit 4 for providing an internal supply voltage UO and a control- and evaluation circuit 5, to which other modules, for example, a measuring device 6 or a display- and/or service unit 7, is connectable.

The measuring device 6 can be, depending on process variable to be measured, for example, a pressure measuring device, a flow sensor or a fill level measuring device. The measuring device 6 serves for determining the process variable and for producing a measuring signal representing the process variable. For this, the measuring device 6 includes, for example, a measuring electronics 6a and, connected thereto, a measuring transducer 6b, e.g. a sensor or a probe.

Furthermore, connectable to the control- and evaluation unit 5 can be the display- and/or service unit 7 for presenting information, for example, the process variable, and/or for servicing, especially parametering. The display and/or service unit 7 can comprise, for example, a contact sensitive screen, or touch screen, which preferably is held in a field device housing surrounding the field device 1.

The field device electronics 2 located within the field device 1 is connected, for example, via corresponding connection terminals K1 and K2, to a cable 8, especially a two-wire cable, so that during operation an energy supply of the field device 1, and the field device electronics 2, and a signal transmission between the field device 1, and the field device electronics 2, and a superordinate unit, can occur via the cable, especially the two wire cable. For this, the field device electronics includes a supply conductor 9 and a return conductor 11, via which a terminal voltage UK provided across the terminals K1 and K2 by means of the two-wire cable is internally distributed.

The input circuit 3 includes in the supply conductor 9 in FIG. 1 and only schematically illustrated a series regulator 13, which is adapted to set an electrical input current $I_{in}$ flowing from the connection terminal K1 via the supply conductor 9 and the return conductor 11 to the connection terminal K2. The setting of the electrical current occurs, in such case, preferably according to a standard usual in automation engineering, for example, the 4-20 mA standard. For this, the electrical current I is supplied via the terminal K1 to the field device 1 via the cable 8, especially the two wire cable, and, based on a signal supplied to the series regulator 13 and corresponding to the measuring signal of the measuring device 6, set by the series regulator 13 to an electrical current value, preferably between 4-20 mA, and returned via the terminal K2 to the cable 8, so that a superordinate unit can ascertain the corresponding measured value based on the electrical current value of the electrical current I. Additionally, the electrical current can be superimposed with a communication signal KS predetermined by the control- and/or evaluation unit 5 by modulating a corresponding value onto the electrical current in accordance with a predetermined communication protocol. Used for this is preferably the communication protocol defined by the HART standard, in the case of which a high frequency oscillation of +/−0.5 mA reflecting the communication signal KS is modulated onto the electrical current lying between 4 mA and 20 mA.

Alternatively, the electrical current can for connecting the field device 1 to a digital data bus be set to an electrical current value predetermined independently of the measured process variable, onto which electrical current value is superimposed a, for example, communication signal produced by the measuring electronics 6a of the measuring device 6, especially a communication signal, in the form of a high frequency oscillation reflecting the measured process variable. Known for this are the PROFIBUS, FOUNDATION FIELDBUS and CAN-BUS standards.

Following the series regulator 13 in a first transverse branch 17 connecting the supply conductor 9 with the return conductor is a shunt regulator 15. The shunt regulator 15 is in the simplest case a Z diode, via which the terminal voltage UK applied across the connection terminals K1 and K2 is stabilized for supplemental application. Also inserted in the return conductor 11 is a shunt resistance 16 for reading the input current $I_{in}$.

Further following the series regulator 13 in the supply conductor 9 is the supply unit 4, which can comprise, for example, a direct voltage converter, i.e. a DC/DC converter. In the embodiment shown in FIG. 1, the supply circuit 4 comprises a clocked DC/DC converter having a primary side and a secondary side. The primary side is connected via the supply conductor 9 with the connection terminal K1. The supply unit 4 provides on its secondary side an internal operating voltage UO having a corresponding internal operating power PO=UO*IO. The supply voltage UO serves to supply the additional, secondary side components of the field device electronics, for example, the control- and/or evaluation unit 5, and the modules, which can be connected with the field device electronics 2, for example, the measuring device 6 or the display- and/or service (interaction) unit 7.

The terminal voltage UK corresponds, thus, to a sum of a voltage drop ΔU produced across the series regulator 13, a voltage UTrans falling across the first transverse branch 17, and a shunt voltage UShunt falling across the shunt resistance.

Due to the cable 8, especially the two wire cable, which is connected at the connection terminals K1 and K2, the power consumption Pin=UK*$I_{in}$ of the field device electronics 2 is limited to a maximum value. This leads to the fact that the supply circuit 4 in the case of providing the internal operating voltage UO can also only provide a limited internal supply power POstat=UO*IO.

In order, in spite of this, to be able to feed other components of the field device electronics or modules connected thereto, a first capacitance C1 is connected in front of the supply circuit 4 in parallel with the first shunt circuit 17 in a second transverse branch 18. The first capacitance C1 is arranged on the primary side as shown in FIG. 1. The first capacitance C1 can be embodied, for example, in the form of one or more capacitors. Due to the shortage of space in a field device 1, the first capacitance C1 is sized in such a manner that the first capacitance C1 is less than 1000 µF, preferably less than 500 µF, especially preferably less than 300 µF. The first capacitance C1 serves to provide an intermediate buffering, or—storage, of energy. Via the energy stored in the first capacitance C1, then other components of the field device electronics 2 or modules 6, 7 connected thereto can be provided dynamically with increased power.

According to the invention, the control- and/or evaluation unit 5 is adapted in such a manner that a buffer voltage UBuffer, which lies across the first capacitance C1, is registered. Such can occur, for example, with the aid of a voltage divider, which is connected between the tapping point for the buffer voltage UBuffer and the control- and/or evaluation unit 5. The control- and/or evaluation unit 5 is adapted, furthermore, based on the ascertained buffer voltage UBuffer or a variable dependent thereon, to provide a decision concerning, or for, at least one part of the field device electronics 2.

A decision for at least one part of the field device electronics 2 can happen, for example, in such a manner that the control- and/or evaluation unit 5 ascertains based on the registered buffer voltage UBuffer an energy stored in the first capacitance C1, wherein the energy $E=\frac{1}{2}*UBuffer*C1$. Based on the ascertained energy stored in the first capacitance C1, an up to date charge status of the first capacitance C1 can be determined. Based on the current charge state, the control- and/or evaluation unit 5 can, in turn, with targeting, operate individual components, or modules, such as, for example, the measuring device 6 or the display- and/or service unit 7. Especially, the control- and/or evaluation unit 5 can activate individual components, or modules, when the charge status is sufficient or, in given cases, deactivate, when the charge status is critical. Thus, the control- and/or evaluation unit 5 makes a decision for the component, or the module.

Furthermore, the control- and/or evaluation unit 5 can be designed such that it checks the buffer voltage UBuffer whether a certain minimum threshold is subceeded. In the case, in which the buffer voltage UBuffer subceeds the minimum threshold, then the control- and/or evaluation unit 5 can run the measuring device 6 into a secure state, e.g. strategically interrupt the measuring and store the already measured values.

The control- and/or evaluation unit 5 can, however, also be adapted such that a decision is made for at least one part of the field device electronics 2. Such can occur, for example, in such a manner that when the buffer voltage UBuffer subceeds an expected value, the control- and/or evaluation unit 5 determines a failure state of the field device electronics 2 and, in given cases, signal this. For this, the expected value is preferably established as a function of the terminal voltage.

Furthermore, based on the ascertained buffer voltage, a more precise power distribution can be performed by the control- and/or evaluation unit 5 for the internal components of the field device electronics and/or the modules connected thereto. For this, it can be provided that, supplementally to the ascertained charge status of the first capacitance C1, also the energy required by the individual components of the field device electronics 2, or modules, is known. Such can be achieved, for example, by furnishing or storing in the control- and/or evaluation unit 5 the energy required by the components, or modules. Alternatively, the required energy can also be stored in the individual components, or modules, of the field device electronics 2.

The field device electronics 2 can, furthermore, include a comparison circuit 10, which is adapted to register a transverse current ITrans, which is flowing in the first transverse branch 17, in which the shunt regulator 15 is arranged. Based on the registered transverse current Itrans, a comparison with a stored threshold value IThres can be performed and a signal ACC, which shows a comparison result, produced and made available, or fed, to the control- and/or evaluation unit 5. The control-and/or evaluation unit 5 is, in turn, adapted to register as needed the buffer voltage UBuffer or the variable dependent thereon, based on the signal ACC. Due to the fact that the transverse current ITrans is a measure for the charge status of the first capacitance C1, then the registering of the buffer voltage can be performed with a variable frequency. In such case, the control- and/or evaluation unit 5 can be adapted to increase the frequency, with which the buffer voltage UBuffer or the variable dependent thereon is registered, when the signal ACC as a comparison result shows an exceeding of the stored threshold value by the transverse current.

In supplementation, or alternatively, for this, the control- and/or evaluation unit 5 can, furthermore, be adapted based on the registered buffer voltage UBuffer or the variable dependent thereon to control a starting of modules connectable in the field device electronics 2, for example, the measuring device or the display- and/or service unit. For this, the buffer voltage or the variable dependent thereon is compared with a starting threshold value of the control- and/or evaluation unit 5 and only upon the exceeding of the starting threshold value by the buffer voltage UBuffer or the variable dependent thereon are the connectable modules supplied with energy, so that they can start.

Again, supplementally or alternatively, for this, the field device electronics 2 can have a second capacitor C2 arranged on the primary side of the DC/DC converter. The second capacitor C2 can be arranged, for example, in the module of the measuring device 6 and serve at least partially to provide the energy requirement required in the case of a measurement procedure of the measuring device 6. For this, the field device electronics 2 is embodied to charge the second capacitor C2 from the first capacitance C1 as a function of the registered buffer voltage UBuffer or the variable dependent thereon, for example, in the case of the reaching, or exceeding of a predetermined value. The control of the charging of the second capacitor C2 occurs preferably by way of a switching element 19, for example, a FET, transistor or a switching regulator, which is preferably controlled by the connected module.

The invention claimed is:

1. A field device electronics for a field device of automation engineering, comprising:
    a first terminal and a second terminal for connecting the field device electronics to a cable so that an electrical input current is suppliable to the field device electronics via the cable and a terminal voltage can be applied across the first and second terminals;
    a series regulator to set the input current so that data, including a measured value and/or parameter values, are transferable via the cable based on the electrical input current;
    a shunt regulator following the series regulator;

a first capacitance connected in parallel with the shunt regulator for energy storage;

a supply circuit connected in parallel with the shunt regulator and the first capacitance for providing an operating voltage;

a control and evaluation unit connected after the supply circuit and supplied with the operating voltage, wherein the control and evaluation unit includes at least one microprocessor adapted to register a buffer voltage across the first capacitance or to register a variable dependent on the buffer voltage and, based on the registered buffer voltage or a variable dependent thereon, to make a decision concerning at least one part of the field device electronics; and a comparison circuit adapted to register a transverse current in a first transverse branch in which the shunt regulator is arranged, and further adapted to perform a comparison of the transverse current with a threshold value and to provide a signal that shows a comparison result to the control and evaluation unit, wherein the control and evaluation unit is further adapted to register the buffer voltage or the variable dependent thereon as needed based on the signal.

2. The field device electronics as claimed in claim 1, wherein the making of the decision concerning the at least one part of the field device electronics includes a determining of a current state, including a failure state, of the at least one part of the field device electronics and/or the making of the decision for the at least one part of the field device electronics includes a specific controlling of the at least one part of the field device electronics.

3. The field device electronics as claimed in claim 1, wherein the supply circuit includes a clocked DC/DC converter having a primary side and a secondary side, wherein the DC/DC converter is arranged such that at least the first capacitance is located on the primary side and the operating voltage lies on the secondary side, and the operating voltage supplies at least the control and evaluation unit.

4. The field device electronics as claimed in claim 1, wherein the control and evaluation unit is adapted to increase a frequency with which the buffer voltage or the variable dependent thereon is registered when the signal as comparison result shows an exceeding of the threshold value by the transverse current.

5. The field device electronics as claimed in claim 1, wherein the control and evaluation unit is further adapted, based on the registered buffer voltage or the variable dependent thereon, to control a starting of modules connectable to the field device electronics.

6. The field device electronics as claimed in claim 5, wherein for controlling the starting of the connectable modules, the control and evaluation unit is adapted to compare the buffer voltage or the variable dependent thereon with a starting threshold value and only upon the exceeding of the starting threshold value by the buffer voltage or the variable dependent thereon to supply the connectable modules with energy.

7. The field device electronics as claimed in claim 6, wherein the control and evaluation unit is further adapted, upon the subceeding of the starting threshold value by the buffer voltage or the variable dependent thereon, to signal a failure state.

8. The field device electronics as claimed in claim 1, further comprising:

a measuring device as a connectable module for registering and/or setting a process variable, wherein the measuring device is connected to the control and evaluation unit, wherein the control and evaluation unit is further adapted, based on the registered buffer voltage or the variable dependent thereon, to control the measuring device.

9. The field device electronics as claimed in claim 8, wherein the control and evaluation unit is further adapted for controlling the measuring device to compare the registered buffer voltage or the variable dependent thereon with a minimum buffer voltage value and, upon the subceeding of the minimum buffer voltage value, to run the measuring device in a safe state, in which the measuring device does not register and/or set the process variable.

10. The field device electronics as claimed in claim 9, wherein the control and evaluation unit is further adapted, upon the subceeding of the minimum buffer voltage value, to perform a data backup, including a backup of the process variable registered by the measuring device.

11. The field device electronics as claimed in claim 2, wherein, for determining the current state, including the failure state, the control and evaluation unit is adapted to compare the registered buffer voltage or the variable dependent thereon with the terminal voltage and, as a function of the comparison, to determine the current state of the at least one part of the field device electronics.

12. The field device electronics as claimed in claim 11, wherein the control and evaluation unit is further adapted, when the buffer voltage or the variable dependent thereon subceeds the terminal voltage by a predetermined value, to detect the failure state of the at least one part of the field device electronics.

13. The field device electronics as claimed in claim 2, wherein the control and evaluation unit ascertains, based on the registered buffer voltage or the variable dependent thereon, a power distribution for the at least one part of the field device electronics and activates the at least one part of the field device electronics corresponding to the ascertained power distribution.

14. The field device electronics as claimed in claim 13, wherein the control and evaluation unit for ascertaining the power distribution ascertains a remaining energy currently stored in the first capacitance and activates the at least one part of the field device electronics based on the currently stored remaining energy.

15. The field device electronics as claimed in claim 14, wherein the control and evaluation unit ascertains the power distribution based on an energy requirement of the at least one part of the field device electronics required for executing a specific action.

16. The field device electronics as claimed in claim 15, wherein the energy requirement required for executing a specific action is furnished in the control and evaluation unit or in a component, or a module, of the part of the field device electronics.

17. The field device electronics as claimed in claim 3, further comprising:

a second capacitance arranged on the primary side, wherein the field device electronics is further adapted, based on the registered buffer voltage or the variable dependent thereon, at least partially to charge the second capacitance from the first capacitance.

18. The field device electronics as claimed in claim 17, wherein the second capacitance is larger than the first capacitance at least by a factor of 2.

19. The field device electronics as claimed in claim 2, wherein the at least one part of the field device electronics has at least one of the following components, or modules:

the control and evaluation unit, a touch screen connected to the control and evaluation unit, the first capacitance, the measuring device for registering and/or setting a process variable, and connected to the control and evaluation unit, and a radio module serving for wirelessly transferring data, including measured values and/or parameter values, and connected to the control and evaluation unit.

20. The field device electronics of claim 1, wherein the comparison circuit includes at least one comparator.

21. A field device of automation engineering comprising:
a field device electronics, including:
  a first terminal and a second terminal for connecting the field device electronics to a cable so that an electrical input current is suppliable to the field device electronics via the cable and a terminal voltage can be applied across the first and second terminals;
  a series regulator to set the input current so that data, including a measured value and/or parameter values, are transferable via the cable based on the electrical input current;
  a shunt regulator following the series regulator;
  a first capacitance connected in parallel with the shunt regulator for energy storage;
  a supply circuit connected in parallel with the shunt regulator and the first capacitance for providing an operating voltage;
  a control and evaluation unit connected after the supply circuit and supplied with the operating voltage, wherein the control and evaluation unit includes at least one microprocessor adapted to register a buffer voltage across the first capacitance or to register a variable dependent on the buffer voltage and, based on the registered buffer voltage or a variable dependent thereon, to make a decision concerning at least one part of the field device electronics; and
  a comparison circuit adapted to register a transverse current in a first transverse branch in which the shunt regulator is arranged, and further adapted to perform a comparison of the transverse current with a threshold value and to provide a signal that shows a comparison result to the control and evaluation unit, wherein the control and evaluation unit is further adapted to register the buffer voltage or the variable dependent thereon as needed based on the signal.

* * * * *